US008376835B2

(12) United States Patent
Ryan et al.

(10) Patent No.: US 8,376,835 B2
(45) Date of Patent: Feb. 19, 2013

(54) SHARING WAGERING GAME MACHINE RESOURCES

(75) Inventors: Chad A. Ryan, Henderson, NV (US); Charles R. Bleich, Cary, IL (US)

(73) Assignee: WMS Gaming Inc., Waukegan, IL (US)

(*) Notice: Subject to any disclaimer, the term of this patent is extended or adjusted under 35 U.S.C. 154(b) by 1024 days.

(21) Appl. No.: 12/375,883

(22) PCT Filed: Aug. 7, 2007

(86) PCT No.: PCT/US2007/017533

§ 371 (c)(1),
(2), (4) Date: Jan. 30, 2009

(87) PCT Pub. No.: WO2008/021081

PCT Pub. Date: Feb. 21, 2008

(65) Prior Publication Data

US 2009/0239657 A1 Sep. 24, 2009

Related U.S. Application Data

(60) Provisional application No. 60/821,722, filed on Aug. 8, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............... 463/24; 463/16; 463/30; 273/292

(58) Field of Classification Search .................... 463/16, 463/24, 30; 273/292

See application file for complete search history.

(56) References Cited

U.S. PATENT DOCUMENTS

| | | | |
|---|---|---|---|
| 4,621,814 | A | 11/1986 | Stepan et al. |
| 5,707,286 | A | 1/1998 | Carlson |
| 5,759,102 | A | 6/1998 | Pease et al. |
| 6,135,887 | A | 10/2000 | Pease et al. |
| 6,517,437 | B1 | 2/2003 | Wells et al. |
| 6,676,522 | B2 | 1/2004 | Rowe et al. |
| 6,682,421 | B1 | 1/2004 | Rowe et al. |
| 6,899,627 | B2 | 5/2005 | Lam et al. |
| 6,971,956 | B2 | 12/2005 | Rowe et al. |
| 6,979,266 | B2 | 12/2005 | Lemay et al. |
| 6,997,803 | B2 | 2/2006 | LeMay et al. |
| 2003/0064807 | A1 | 4/2003 | Walker et al. |
| 2004/0082385 | A1 | 4/2004 | Silva et al. |
| 2004/0166917 | A1 | 8/2004 | Lam et al. |
| 2004/0166932 | A1 | 8/2004 | Lam et al. |

(Continued)

FOREIGN PATENT DOCUMENTS

WO WO-2004075128 A1 9/2004

OTHER PUBLICATIONS

"International Application Serial No. PCT/US2007/017533, Search Report and Written Opinion mailed Sep. 15, 2008."8 pgs.

(Continued)

*Primary Examiner* — David L Lewis
*Assistant Examiner* — Adetokunbo Torimiro
(74) *Attorney, Agent, or Firm* — Schwegman Lundberg & Woessner, P.A.

(57) ABSTRACT

Apparatus, systems, and methods may operate to determine that a second resource is available to be shared in place of a first resource located in a first wagering game machine operable to receive a wager associated with a wagering game. The second resource may be located apart from the first wagering game, perhaps in a second wagering game machine, or in a wagering game server.

21 Claims, 4 Drawing Sheets

U.S. PATENT DOCUMENTS

| | | | | |
|---|---|---|---|---|
| 2004/0254006 | A1 | 12/2004 | Lam et al. | |
| 2004/0254013 | A1 | 12/2004 | Quraishi et al. | |
| 2005/0020340 | A1 * | 1/2005 | Cannon | 463/16 |
| 2006/0068920 | A1 | 3/2006 | Lemay et al. | |
| 2006/0073883 | A1 | 4/2006 | Franks, Jr. | |

OTHER PUBLICATIONS

"Application Serial No. PCT/US2007/017533, Int'l Preliminary Examination Report Mailed Jun. 17, 2009".

* cited by examiner

SHARING WAGERING GAME MACHINE RESOURCES

RELATED APPLICATION

This patent application is a U.S. National Stage Filing under 35 U.S.C. 371 from International Patent Application Ser. No. PCT/US2007/017533 filed Aug. 7, 2007, and published on Feb. 21, 2008, as WO 2008/021081 and republished as WO 2008/021081 A3, which claims the priority benefit of U.S. Provisional Patent Application Ser. No. 60/821,722 filed Aug. 8, 2006 and entitled "SHARING WAGERING GAME MACHINE RESOURCES", which applications are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure as it appears in the Patent and Trademark Office records, but otherwise reserves all copyright rights whatsoever. Copyright 2006, 2007, WMS Gaming, Inc.

FIELD

The subject matter disclosed herein relates generally to wagering game systems, including resource sharing among wagering game machines.

BACKGROUND

Casinos and others that provide wagering game machines for use by the public prefer to offer machines that operate in a substantially continuous fashion. First, because player interest is more easily maintained when machine interaction continues uninterrupted by faulty components and/or the lack of expendable elements, such as printer paper. Second, because the longer a machine is available for play, the greater the potential profit available to the owner. Thus, there is a need for wagering game machines that provide increased availability to the player.

BRIEF DESCRIPTION OF THE FIGURES

Embodiments of the invention are illustrated by way of example, and not limitation, in the Figures of the accompanying drawings in which.

DESCRIPTION OF THE EMBODIMENTS

Example Wagering Game Machine Architecture

In order to address the challenges mentioned above, wagering game machines and wagering game servers may be constructed to take advantage of resource sharing between and among game machines. That is, when a resource is needed by a first wagering game machine, but is not available (e.g., a printer runs out of paper on the first machine prior to printing out a payoff ticket), an equivalent resource may be located at a second wagering game machine, or at a server, and used in its place. Such resource sharing may occur directly, where the first wagering game machine directly controls the shared resource located in the second wagering game machine. Sharing may also occur indirectly, where the first wagering game machine instructs the second wagering game machine to operate the shared resource as directed by the first machine.

Figure 1:
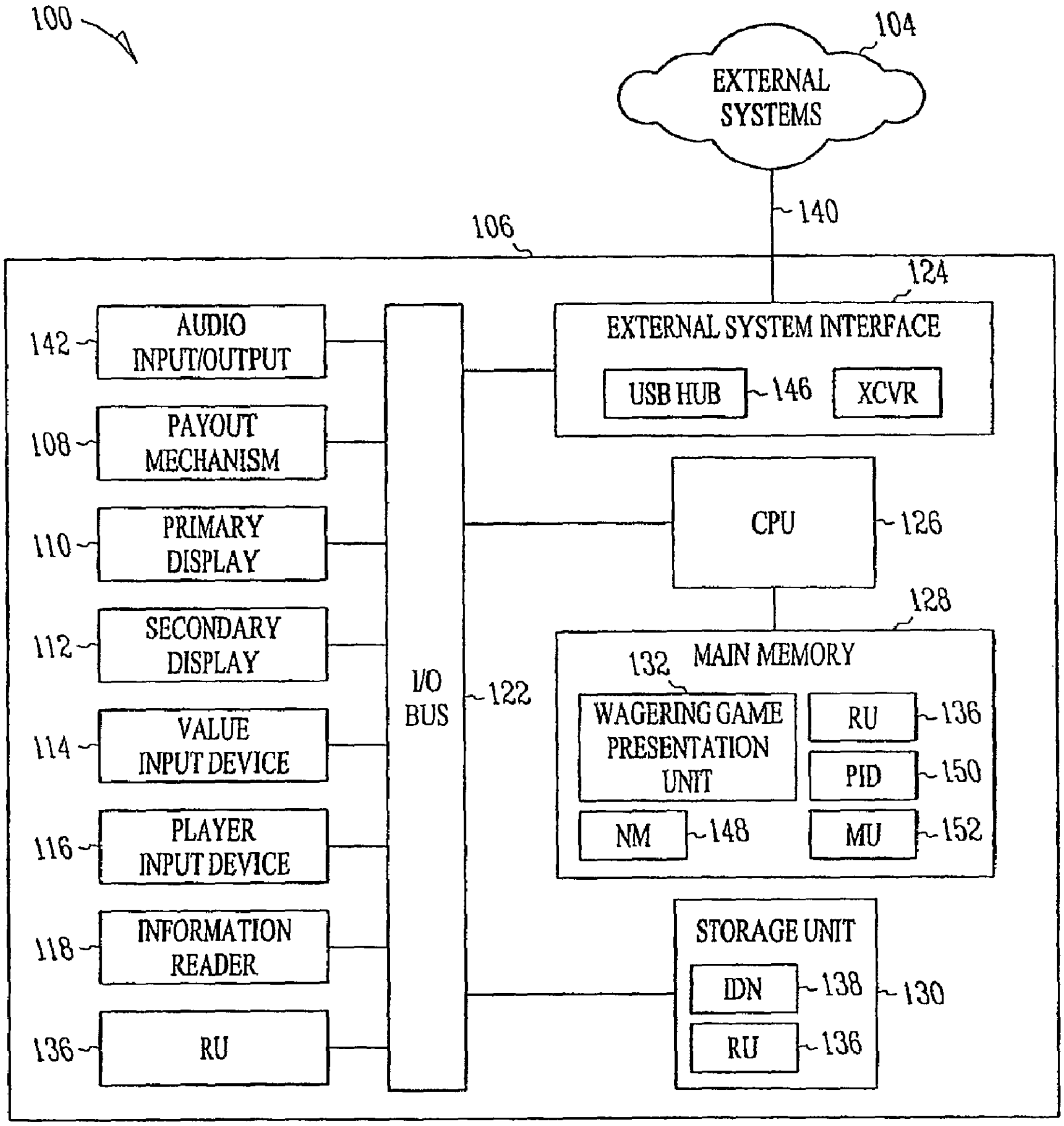
FIG. 1 is a block diagram of a wagering apparatus and a wagering game machine, according to example embodiments of the invention.

FIG. 1 is a block diagram illustrating a wagering game machine architecture, including a control system, according to example embodiments of the invention. As shown in FIG. 1, the wagering game machine 106 may include a central processing unit (CPU) 126 connected to a main memory 128, which may include, in turn, a wagering game presentation unit 132. In many embodiments, the wagering game presentation unit 132 can present wagering games, such as video poker, video blackjack, video slots, video lottery, etc., in whole or part, in response to receiving a wager.

In some embodiments, the wagering game machine 106 may include, or be coupled to, a resource unit 136, which may comprise one or more of a resource location unit, a resource existence unit, and a resource availability unit. In many embodiments, a "resource" is a hardware device that has the potential to be controlled by a wagering game machine from which it is remotely located. Thus, resources may include devices such as displays, touch screens, keyboards, player input devices (e.g., joysticks), information readers (e.g., radio frequency identification (RFID) readers, magnetic card readers), pushbutton panels, payout mechanisms, printers, value input devices (e.g., bill acceptors, coin acceptors), and audio frequency communication devices (e.g., speakers). That is, resources are devices having functions whose operation can be determined exclusively by a remotely-located wagering game machine. Resources are not considered to include devices which simply respond to game results generated by a wagering game machine, such as a display that reports the gaming results for multiple wagering game machines involved in a tournament sharing a common jackpot. Resources also do not include fixed or removable memory devices, such as memory coupled to a processor, disk drives, CD-ROMs, etc.

Resources are "shared" directly when they are directly controlled by a wagering game machine other than that in which they physically reside (e.g., the machine housing the resource gives up control of the resource to the controlling machine). Resources are shared indirectly when another gaming machine instructs the gaming machine in which the resource resides to operate the shared resource in a particular manner. Thus, in the direct sharing case, the wagering game machine that houses the resource refrains from operating the resource so that the remotely-located wagering game machine can operate it. In the indirect sharing case, the wagering game machine that houses the resource operates the resource according to instructions received from another wagering game machine, and not according to instruction generated by itself (as is the case when the resource is not being shared).

The CPU 126 may also be connected to an input/output (I/O) bus 122, which facilitates communication between the wagering game machine's components. The I/O bus 122 may be connected to a variety of devices, including resources, such as a payout mechanism 108, a primary display 110, a secondary display 112, a value input device 114, a player input device 116, and an information reader 118. The player input device 116 can include the value input device 114 to the extent the player input device 116 is used to place wagers. In some embodiments, the value input device 114 can electronically receive wagering value (e.g., monetary value) from a player's casino account or other suitable "cashless gaming" value source.

The I/O bus 122 may also be connected to an external system interface 124, perhaps comprising a wired network interface card and/or a wireless transceiver XCVR, which may in turn be connected to external systems 104 (e.g., wagering game networks, local area networks, and other networks, including global networks) via a wired or wireless connection 140. In some embodiments, the external system interface 124 may comprise a universal serial bus (USB) hub 146 (e.g., a multi-host USB hub, similar to or identical to that which can be constructed using a Standard Microsystem's SMSC USB2524 integrated circuit) to interface or couple multiple wagering game machines, similar to or identical to the wagering game machine 106, to a shared USB peripheral/resource so that any one or more of the wagering game machines so coupled may be used to control various resources located apart from the wagering game machine 106, or within the wagering game machine 106. For more information regarding the universal serial bus, the reader is referred to the Universal Serial Bus Specification Version 2.0 (2000), published by USB-IF; 5440 SW Westgate Drive, Suite 217; Portland, Oreg. 97221, and recent amendments thereto, incorporated herein by reference.

In some embodiments, the I/O bus 122 may be coupled to one or more audio input/output units 142. These units 142 may comprise, in turn speakers, microphones, transducers, amplifiers, filters, voice recognizers, and other devices that can be used to process sonic information.

In some embodiments, the wagering game machine 106 can include additional peripheral devices (e.g., storage unit 130), resources (e.g., primary display 110 and value input device 114), and/or more than one of each component shown in FIG. 1. For example, in some embodiments, the wagering game machine 106 can include multiple external system interfaces 124 and multiple CPUs 126. In some embodiments, any of the components can be integrated or subdivided. Additionally, in some embodiments, the components of the wagering game machine 106 can be interconnected according to any suitable interconnection architecture (e.g., star, chain, hypercube, etc.).

In some embodiments, any of the components of the wagering game machine 106 (e.g., the wagering game presentation unit 132) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, memories 128, 130, etc. Machine-readable media also includes any media suitable for transmitting software over a network.

In some embodiments, a first wagering game machine is permitted to use a resource included in a second wagering game machine when the first wagering game machine is incapable of performing some function that it normally performs (e.g., paying off a winner) and therefore the resource of the second wagering game machine may serve as a backup. The function may be handed off to the resource in the second wagering game machine automatically, or at the direction of the player or a casino operator, for example. When handed off automatically, the wagering game machine that needs to locate a resource may search for an idle nearby wagering game machine that includes the desired resource, and can serve as the backup by sharing the resource. Such searching and sharing may occur between machines (e.g., via USB or wireless connection), or over a network, perhaps using a server as an idle resource arbiter.

Concrete examples of sharing may include a player operating a wagering game machine A and, after a time, deciding to cash out. If machine A determines it can't make the payment at that time (e.g., machine A is out of paper for its printer resource), then machine A may check other wagering game machines nearby for availability of the needed resource type. Thus, machine A may find that machine B (perhaps located right next to machine A) is currently idle and has a printer with paper in it, so that machine A can offer the player the option of having the payout ticket printed immediately by machine B, instead of waiting until a casino attendant has time to service machine A.

Similarly, considering a bill acceptor as a resource, if the stacker is full and a player and her spouse are playing in the casino on different games, it could be possible for the spouse to insert money into his machine, so that the value would be transferred to the machine she is operating. Peer to peer electronic funds transfer may be used between machines, or among machines, perhaps regulated by a server over a network. In some embodiments, resources may also be shared for diagnostic purposes, such as a technician using a display in a first wagering game machine to display diagnostic information as directed by (and associated with) a second wagering game machine.

In some embodiments, sharing may be implemented via an attendant function. That is, if the need for a particular resource is determined at a first wagering game machine, an attendant may manually specify the location of a resource (e.g., enter a resource identification number for a remotely-located resource), and thus intervene to cause a resource located at another machine to be shared. For example, a resource may be identified via manually entering a specific asset number (i.e., an internal identification each casino property uses to uniquely identify individual gaming devices) directly, or the attendant may choose an asset number or other identifier from a list presented to him at the first wagering game machine. In some embodiments, the first wagering game machine might display a partial map of the casino floor near its location and allow the attendant to select a specific second machine, having the needed resource, via this type of graphic interface.

While this mechanism makes use of a casino employee, recovery time should still be less than conventional solutions because a typical operation involves the attendant observing the wagering game machine to identify the problem, leaving the machine to locate replacement articles (e.g., to locate new paper stock for a printer), and then returning to the machine to rectify the problem. Using the above method, the transaction might be finished during the attendant's first visit to the machine by sending the transaction to another available machine, permitting the player to move on while the attendant concentrates on rectifying the problem at the original machine.

Other embodiments may be realized. For example, wagering game machines may be connected to a server (see FIG. 2) that contains a map of the casino floor including the location of each wagering game machine. Thus, when a particular machine determines the need to use a resource in another machine, it may contact the server and indicate the type of resource needed. The server may then determine which machines are available in the immediate area of the machine looking for a resource, and then verify the availability of the appropriate resource within available wagering game machines.

Either the original wagering game machine or the server might then operate to choose one of several proximate wagering game machines having the needed resource, and direct the player toward the chosen machine. A map or list may also be displayed to the player, permitting manual selection of a machine for resource sharing use. Another possibility for manual selection includes an attendant-driven system, where the map is displayed to an attendant, who is then permitted to choose a resource for sharing. Thus fully automated resource selection, player-driven resource selection, and attendant-drive resource selection, or some combination of these mechanisms, may be used in various embodiments.

If an embodiment is completely player-driven, meaning no attendant or casino personnel are required during the process, then an authorization code or identification (e.g., provided by one or more of a player tracking card, a login name, a password, a personal identification number (PIN), a wrist bracelet, etc.) might be used at the machine controlling the resource, the machine housing the resource, or both, to help ensure that only the correct player is able to receive any money or other value that might be transferred during the sharing process. Similar identification mechanisms may be used if attendants are permitted to select shared resources.

In some embodiments, wagering game machines might be configured by an operator with resource information, including information concerning the resources available at other wagering game machines in the immediate vicinity at the time it is installed. For example, this could be achieved by allowing the operator to input the asset numbers of the wagering games machines to the left and right of the wagering game machine to be installed and configured. Thereafter, the configured wagering game machine (in the middle) would be aware of its neighbors, and perhaps the resources they might have available for sharing, if the resources were associated with the asset numbers, either via direct entry of the information into the configured machine, or using a network connection to download the information from a server (or the neighboring machines). In some embodiments, a wagering game machine in a selected cluster or grouping of other machines might configure itself by communicating, via wired or wireless connection 140, and use a handshaking protocol with the other machines to let them know its own capabilities (e.g., what resources it has and whether or not the resources can be shared), and perhaps to make initial, or additional queries as to what capabilities each of the neighboring machines possess.

Once configuration is finished, if a player attempts to complete a transaction the configured wagering game machine can't process (e.g., printing a ticket when the wagering game machine has no paper), the configured wagering game machine can query its neighbors, such as the other machines in an assigned cluster, to inquire if they are idle (e.g., no players playing and no credit on their credit meters) and/or if the resource the configured wagering game machine needs is available for use with no current error conditions. If one of the neighboring machines is available, has the needed resource, and has no errors pending, then the configured wagering game machine might present the player with the option to complete the transaction using the available machine. The player can then accept this option and, upon acceptance, the configured wagering game machine can send the transaction to the appropriate neighboring machine to which the player was originally directed (or was permitted to select, perhaps from a menu).

In some embodiments, when players use some form of identification, such as a player card, biometrics, or login identification, the pending transaction can be stored on a server and the player may be permitted to go to any number of machines on a network to complete the transaction.

In some embodiments, peer to peer transfer of funds might be used to move funds from one wagering game machine directly to another. Transferring funds between machines may also be managed by a server, so that funds are uploaded from one wagering game machine to a server, and then downloaded from the server to another wagering game machine that has an available resource. Either process may appear the same to the player, but can be different from a processing perspective.

For example, when payout tickets are printed using conventional machines, they typically include the asset number of the printing machine, which is also the machine that meters the funds printed on the ticket. If indirect resource sharing is used, funds might be moved from one machine to another, such that the machine housing the printer is directed to control the print job by the machine seeking the shared printer resource, and both machines might be involved in metering and logging the transfer of funds. Thus, the printing machine might be directed to operate so as to meter and log the transaction, printing its asset number on the ticket dispensed. If the direct resource sharing is implemented, then conventional metering and logging may be used in some embodiments, since no funds are transferred to the printing machine. In this case, the printed ticket might include the asset number of the wagering game machine in direct control of the printer (i.e., the player's original machine).

Thus, many embodiments may be realized. For example, some wagering game machines may operate to locate resources apart from themselves. In this case, an apparatus 100 may comprise a wagering game machine 106 having a wagering game presentation unit 132 responsive to receiving a wager in association with a wagering game, and a resource location unit 136 operable to locate a resource in another wagering game that can be shared (e.g., directly or indirectly). Such resources may include bill acceptors, printers, displays, touchscreens, keyboards, magnetic card readers, pushbutton panels, RFID readers, and audio frequency communication devices. For example, a resource may include a display housed by another wagering game machine, which is used to display diagnostic information associated with the original wagering game machine 106.

In some embodiments, a wireless network interface XCVR may be included in the wagering game machine 106. Memories 128, 130 may also be included in the wagering game machine 106, perhaps used to store identification information 138 associated with a plurality of resources IDN, and/or players PID.

Some wagering game machines 106 may include a resource existence unit 136 to determine the existence of resources, either within themselves, or in other machines. In some embodiments, the a wagering game machine 106 may include a resource availability unit 136 to determine the availability of resources for sharing, as opposed to mere existence, so that an existing resource is actually available for use when needed, and not subject to use by another entity, or suffering from an error condition. The resource availability unit 136 may be located internally, or in other machines. In some embodiments, the apparatus 100 may include a notification module 148 to notify servers, attendants, and/or players that resources are being shared between wagering game machines.

In some cases, the wagering game machine 106 may operate to locate resources within itself. In this case, an apparatus 100 may comprise a wagering game machine 106 having a wagering game presentation unit 132 responsive to receiving a wager in association with a wagering game, and a resource location unit 136 operable to locate a resource included in the wagering game machine 106, and usable for sharing with a second wagering game machine. The apparatus 100 may include a player identification unit 150 to identify a player associated with an activity/transaction conducted on the wagering game machine 106, or another wagering game machine (e.g., one that controls a resource housed in the wagering game machine 106 during a resource sharing operation). The apparatus 100 may also include a mapping unit 152 to communicate the location of a resource to be shared, or a wagering game machine or server housing the resource, to the player.

Figure 2:
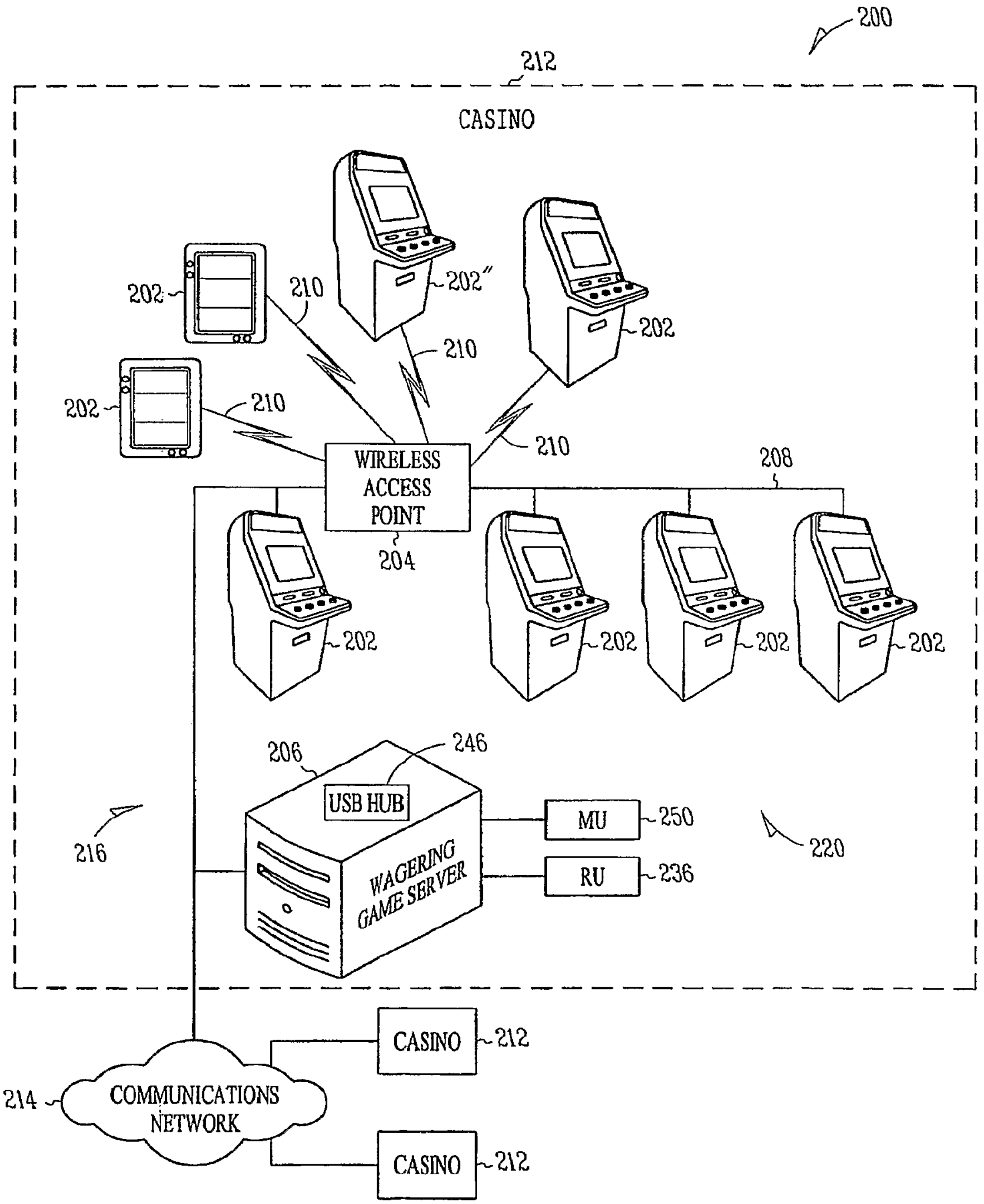
FIG. 2 is a block diagram illustrating a wagering game network, according to example embodiments of the invention.

While FIG. 1 describes example embodiments of a wagering game machine architecture, FIG. 2 shows how a plurality of wagering game machines can be connected in a wagering game network.

Example Wagering Game Network

FIG. 2 is a block diagram illustrating a wagering game network, according to example embodiments of the invention. As shown in FIG. 2, the wagering game network 200 includes a plurality of casinos 212 connected to a communications network 214.

Each of the plurality of casinos 212 may include a local area network 216, which can include one or more wireless access points 204, wagering game machines 202, and a wagering game server 206 operable to serve wagering games and other information, such as resource location, existence, and availability, over the local area network 216. As such, the local area network 216 may include wireless communication links 210 and wired communication links 208. The wired and wireless communication links 208, 210 can employ any suitable connection technology, such as Bluetooth, 802.11, Ethernet, public switched telephone networks, SONET, etc. In one embodiment, the wagering game server 206 can serve wagering games and/or distribute content/information to devices located in other casinos 212 or at other locations on the communications network 214.

The wagering game machines 202 and wagering game server 206 can include hardware and machine-readable media including instructions for performing the operations described herein. The wagering game machines 202 may be similar to or identical to the wagering game machine 106 illustrated in FIG. 1.

The wagering game machines 202 described herein can take any suitable form, such as floor standing models, handheld mobile units, bar-top models, workstation-type console models, etc. Further, the wagering game machines 202 can be primarily dedicated for use in conducting wagering games, or form a part of non-dedicated devices, such as mobile phones, personal digital assistants, personal computers, etc. In one embodiment, the wagering game network 200 can include other network devices, such as accounting servers, wide area progressive servers, player tracking servers, and/or other devices suitable for use in connection with embodiments of the invention.

Many additional embodiments may thus be realized. For example, a system 220 may comprise a first wagering game machine 202' having a first resource and a wagering game presentation unit responsive to receiving a wager in association with a wagering game. The system 220 may also include a second wagering game machine 202" having a second resource. The system 220 may include a resource location unit 236 operable to locate the second resource to be shared by the second wagering game machine 202" with the first wagering game machine 202'; that is, the second resource may be substituted for use by the first wagering game machine in place of the first resource.

In some cases, the resource location unit 236 may be included in the first wagering game machine 202'. In some cases, the resource location unit 236 may be included in the second wagering game machine 202".

In some embodiments, the system 220 may include a wagering game server 206 to couple to the first and second wagering game machines 202', 202". Thus, the resource location unit 236 may also be included in, or coupled to, the wagering game server 206. The system 220 may also include a mapping unit 250 to communicate the location of the first and/or second wagering game machines 202', 202" and/or their resources, to players and/or attendants.

In some embodiments, some or all wagering game machines 202 may include a multi-host USB hub interface 146 (see FIG. 1), 246. In this case, the first wagering game machine 202' (including a multi-host USB hub interface) can act as a primary host, controlling its own resources, as is the usual case. However, a second system, such as a backend system or a another wagering game machine 202"(also including a multi-host USB hub interface) can also control the resources in the first wagering game machine 202', as an alternate host, using a second multi-host USB hub interface (e.g., included in the second wagering game machine 202'). In some cases, the USB hub interfaces of the first and second wagering game machines 202', 202" may be directly connected.

In some embodiments, a wagering game server 206 may include a multi-host USB hub interface 246, and the server 206 may operate to: control its own resources (as a primary host), to control resources included in a wagering game machine 202' (as a secondary host), and to share its resources with a wagering game machine 202' (giving up control of its own resources to the wagering game machine 202' or a backend system). In some embodiments, the server 206 may control resources included in the second wagering game machine 202", as directed by the first wagering game machine 202', so that the resources of the second wagering game machine 202" can be shared with the first wagering game machine 202' by using the server 206 as a secondary host. In many of these embodiments, release of direct resource control (e.g., by a primary host) can be requested before control is handed off to the alternate host (e.g., a secondary host), and the resource is shared. Likewise, control can be handed back to the resource owner or primary host after a sharing operation is complete.

Example Wireless Environment

In some embodiments, the wireless access point 204 and wagering game machines 202 can communicate using orthogonal frequency division multiplexed (OFDM) communication signals over a multicarrier communication channel. The multicarrier communication channel can be located within a predetermined frequency spectrum and may comprise a plurality of orthogonal subcarriers. In some embodiments, the multicarrier signals can be defined by closely spaced OFDM subcarriers. Each subcarrier can have a null at substantially the center frequency of the other subcarriers and/or each subcarrier can have an integer number of cycles within a symbol period. In some embodiments, the wireless access point 204 and wagering game machines 202 can communicate in accordance with broadband multiple access techniques, such as orthogonal frequency division multiple access (OFDMA). In some embodiments, the wireless access point 204 and wagering game machines 202 can communicate using spread-spectrum signals.

In some embodiments, the wireless access point 204 can be included in a communication station, such as wireless local area network (WLAN) communication station including a Wireless Fidelity (WiFi) communication station, or a WLAN access point (AP). In these embodiments, the wagering game machines 202 can be included in a mobile station, such as WLAN mobile station or a WiFi mobile station.

In some embodiments, the wireless access point 204 can be included in a broadband wireless access (BWA) network communication station, such as a Worldwide Interoperability for Microwave Access (WiMax) communication station, since the wireless access point 204 can be included in almost any wireless communication device. The wagering game machines 202 can also form part of a BWA network communication station, such as a WiMax communication station.

In some embodiments, any of the wagering game machines 202 can form part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), and other devices that can receive and/or transmit information wirelessly.

In some embodiments, the frequency spectrums for the communication signals transmitted and received by the wireless access point 204 and the wagering game machines 202 can comprise either a 5 gigahertz (GHz) frequency spectrum or a 2.4 GHz frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz; other frequency spectrums are equally suitable. In some BWA network embodiments, the frequency spectrum for the communication signals can comprise frequencies between 2 and 11 GHz.

In some embodiments, the wireless access point 204 and the wagering game machines 202 can communicate using RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks; transmission and reception may also be conducted in accordance with other techniques and standards. In some BWA network embodiments, for example, the wireless access point 204 and the wagering game machines 202 can communicate using RF signals in accordance with the IEEE 802.16-2004 and the IEEE 802.16(e) standards for wireless metropolitan area networks (WMANs) including variations evolutions thereof. Other techniques and standards are also suitable. For more information with respect to the IEEE 802.11 and IEEE 802.16 standards, please refer to "IEEE Standards for Information Technology—Telecommunications and Information Exchange between Systems" —Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 204 and the wagering game machines 202 can include one or more antennas (not shown). These antennas can comprise directional or omnidirectional antennas, including, for example, dipole antennas, monopole antennas, patch antennas, loop antennas, microstrip antennas, and other types of antennas suitable for the transmission and reception of RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to 1/10 of a wavelength or more.

In some embodiments, handoffs between different wireless access points 204 and one of the wagering game machines 202 can be performed based on the signal-to-noise ratio (SNR), the signal-to-noise and interference ratio (SNIR), a bit-error rate (BER), or the energy per received bit.

In some embodiments, the wireless access point 204 and the wagering game machines 202 can communicate in accordance with standards such as the Pan-European mobile system standard referred to as the Global System for Mobile Communications (GSM). In some embodiments, the wireless access point 204 and the wagering game machines 202 can also communicate using packet radio services such as the General Packet Radio Service (GPRS) packet data communication service. In some embodiments, the wireless access point 204 and the wagering game machines 202 can communicate using the Universal Mobile Telephone System (UMTS) for the next generation of GSM, which can, for example, implement communication techniques in accordance with 2.5 G and third generation (3 G) wireless standards (e.g., see 3GPP Technical Specification, Version 3.2.0, March 2000). In some embodiments, the wireless access point 204 and the wagering game machines 202 can provide packet data services (PDS) utilizing packet data protocols (PDP). In other embodiments, the wireless access point 204 and the wagering game machines 202 can communicate in accordance with other standards or other air-interfaces including interfaces compatible with the enhanced data for GSM evolution (EDGE) standards.

In other embodiments, the wireless access point 204 and the wagering game machines 202 can communicate in accordance with a short-range wireless standard, such as the Bluetooth™ short-range digital communication protocol. Bluetooth® wireless technology is a de facto standard, as well as a specification for small-form factor, low-cost, short-range radio links between mobile PCs, mobile phones and other portable devices. Bluetooth is a trademark owned by Bluetooth SIG, Inc.

In some embodiments, the wireless access point 204 and the wagering game machines 202 can communicate in accordance with an ultra-wideband (UWB) communication technique where a carrier frequency is not used. In some embodiments, the wireless access point 204 and the wagering game machines 202 can communicate in accordance with an analog communication technique. In some embodiments, the wireless access point 204 and the wagering game machines 202 can communicate in accordance with an optical communication technique, such as the Infrared Data Association (IrDA) standard. In some embodiments, the wireless access point 204 and the wagering game machines 202 can communicate in accordance with the Home-RF standard, such as a Home-RF Working Group (HRFWG) standard.

It should be noted that whether the communications network 214 is implemented as a wired network, a wireless network, or some combination of the two, the wagering game machines 202 maybe implemented as thin clients, thick clients, or some combination of both. That is, game code, game outcomes, and/or audio/visual representations of various games in play can reside anywhere on the network 214. Similarly, any functional control (e.g., power conservation controls) for one or more wagering game machines 202, which may exist as virtual machines in some embodiments, may reside anywhere on the network 214.

Any of the components previously described can be implemented in a number of ways, including simulation via software. Thus, the wagering apparatus 100; external systems 104; wagering game machines 106, 202; payout mechanism 108; displays 110, 112; value input device 114; player input device 116; information reader 118; I/O bus 122; external system interface 124; CPU 126; memory 128; storage unit 130; wagering game presentation unit 132; resource units 136, 236; resource identification information 138; connection 140; audio input/output unit 142; USB hub 146; notification module 148; identification unit 150; mapping units 152, 250; wagering game server 206; casinos 212; networks 200, 214, 216; wired communication links 208; wireless communication links 210; system 220; and/or a wireless transceiver XCVR may all be characterized as "modules" herein.

These modules may include hardware circuitry, single or multi-processor circuits, memory circuits, software program modules and objects, firmware, and combinations thereof, as desired by the architect of the apparatus 100 and systems 220, and as appropriate for particular implementations of various embodiments. In some embodiments, the modules may be included in a system operation simulation package such as a software electrical signal simulation package, a power usage and distribution simulation package, a network security simulation package, a power/heat dissipation simulation package, a signal transmission-reception simulation package, or any combination of software and hardware used to simulate the operation of various potential embodiments. Such simulations may be used to characterize or test the embodiments, for example.

It should also be understood that the apparatus and systems of various embodiments can be used in applications other than wagering game machines. Thus, various embodiments of the invention are not to be so limited. The illustrations of apparatus 100 and systems 220 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, and application-specific modules, including multilayer, multi-chip modules. Such apparatus and systems may further be included as sub-components within a variety of electronic systems, such as data bridges, switches, and hubs; televisions and cellular telephones; personal digital assistants; personal computers and workstations; medical devices; radios and video players; and vehicles, among others.

Example Operations

Figure 3:
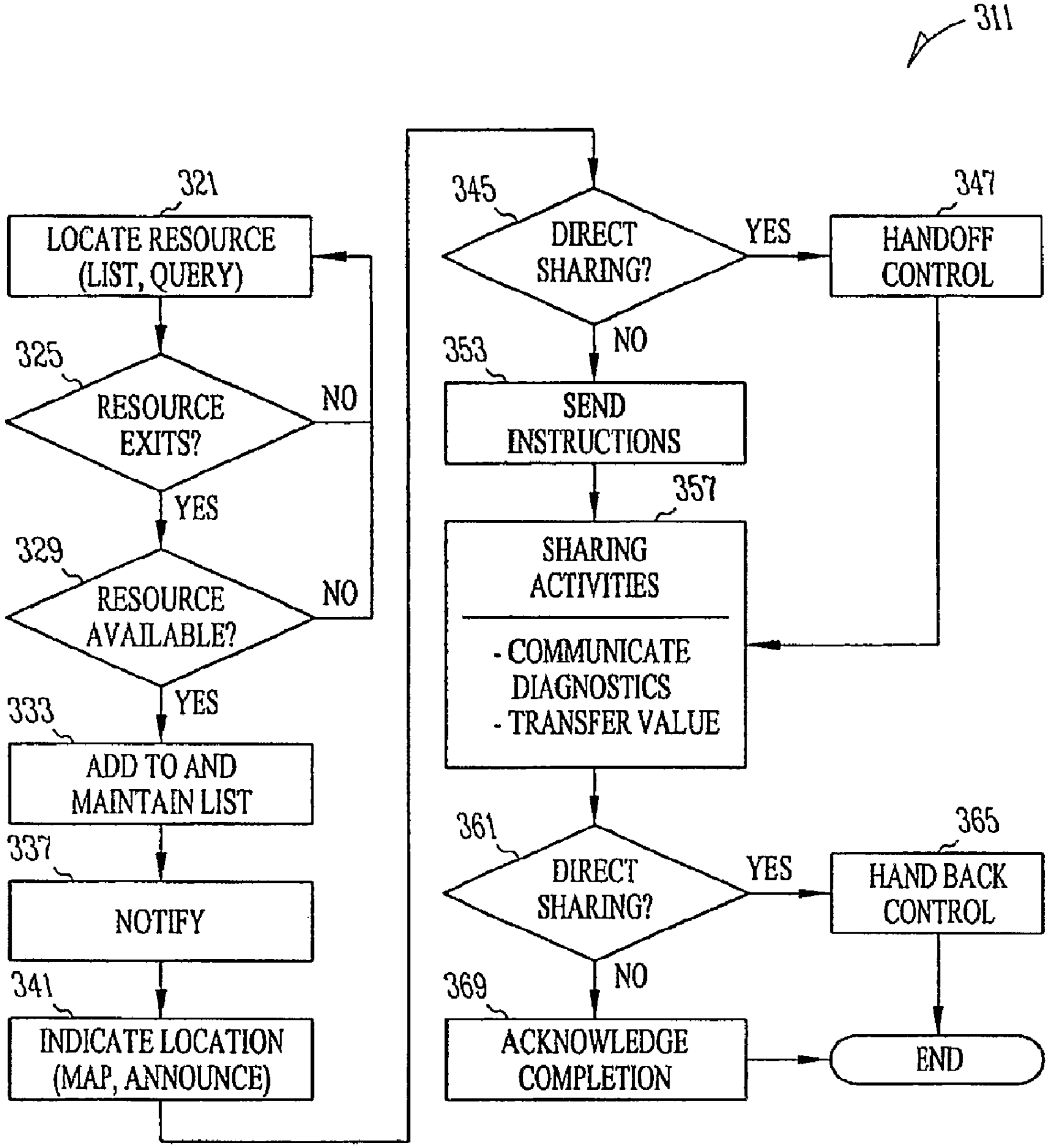
FIG. 3 is a flowchart illustrating various methods, according to example embodiments of the invention.

FIG. 3 is a flowchart illustrating various methods 311 of operating a wagering game machine to share resources, according to example embodiments of the invention. At block 321, the method 311 may include locating a resource for sharing. This may be accomplished by referring to a lookup table or list located within the machine searching. for a resource, or on a server, or even in another machine. Alternatively, or in addition, queries may be sent to other machines or to a server to locate the needed resource. The search may be prompted by determining that the resource is not operating, for example, or it may be that the resource is forecast to fail to operate properly within a defined time period, perhaps according to a selected probability.

The method 311 may continue with determining whether a resource exists at all, at block 325. Of course it should be noted that in some embodiments, resources may be located in servers, such as wagering game servers, as well as in other wagering game machines. If no resources are determined to exist at the time the need is expressed, the search may continue, or be conducted at a later time, at block 321.

If the needed resource exists, then the method 311 may continue at block 329 with determining that, for example, a second resource is available to be shared in place of a first resource located in the wagering game machine searching for the second resource. Typically, the resource sought, then, is located apart from the searching machine. For example, availability may be determined by searching for a resource that is operating, and is not forecast to be needed by its host, or to fail within some predetermined time period. Availability may also be assessed by determining that the second wagering game machine is idle, and/or that the second wagering game machine has no resource errors pending. If no resources are immediately available, the search may continue at block 321.

If a resource exists at a suitable location, and is available, then the method 311 may continue at block 333 with adding to and/or maintaining a list of resources available for sharing.

The method 311 may continue at block 337 with notifying, using audio and/or visual devices, the player and/or an attendant, that the second resource is to be shared in place of the first resource.

The method 311 may continue at block 341 with indicating the location of the shared resource, such as by displaying a map locating the second resource and/or announcing the location associated with the second resource (e.g., the location of the second wagering game machine, or a server housing the resource).

If direct sharing is used, as determined at block 345, then the method 311 may include, at block 347, handing off control of the second resource to the first wagering game machine. If indirect sharing is used, then the method 311 may include, at block 353, sending instructions to the second wagering game machine from the first wagering game machine to accomplish a function associated with the first resource, using the second resource.

In most embodiments, the method 311 includes preparation for, and initiation of sharing activities at block 357. For example, the method 311 may include communicating diagnostic information associated with the first machine, at the second machine, using an audio and/or a visual device as a shared resource. Other sharing activities may include transferring value, such as by transferring value credit from a second wagering game machine to the first wagering game machine, and vice versa, as needed, where the resource comprises a value input device, for example.

If direct sharing is used, as determined at block 361, then the method 311 may include, at block 365, returning control to the second wagering game machine after one or more selected events associated with the second resource occur. If indirect sharing is used (and even if direct sharing is used), then the method 311 may include acknowledging completion of the shared function by the second wagering game machine at block 369. The method 311 may then conclude.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Thus, other embodiments may be realized, including a machine-readable medium encoded with instructions for directing a machine to perform operations comprising any of the methods described herein. For example, some embodiments may include a machine-readable medium encoded with instructions for directing a wagering game machine operable to receive a wager to perform a variety of operations. Such operations may include determining that a second resource located in a second wagering game machine is available to be shared in place of a first resource located in the first wagering game machine.

Additional operations may include (e.g., using direct sharing) handing off control of the second resource to the first wagering game machine, and returning control of the second resource to the second wagering game machine after a selected event associated with the second resource occurs. Other operations may include (e.g., using indirect sharing) sending instructions to the second wagering game machine from the first wagering game machine to accomplish a shared function associated with the first resource at the second resource, and perhaps acknowledging completion of the function by the second wagering game machine.

Still further operations may include determining that the second wagering game machine is idle, maintaining a list of resources available for sharing, and determining that the second wagering game machine has no resource errors pending, among others. Additional operations may include any of the activities presented in conjunction with the methods described above.

Example Wagering Game Machine

Figure 4:
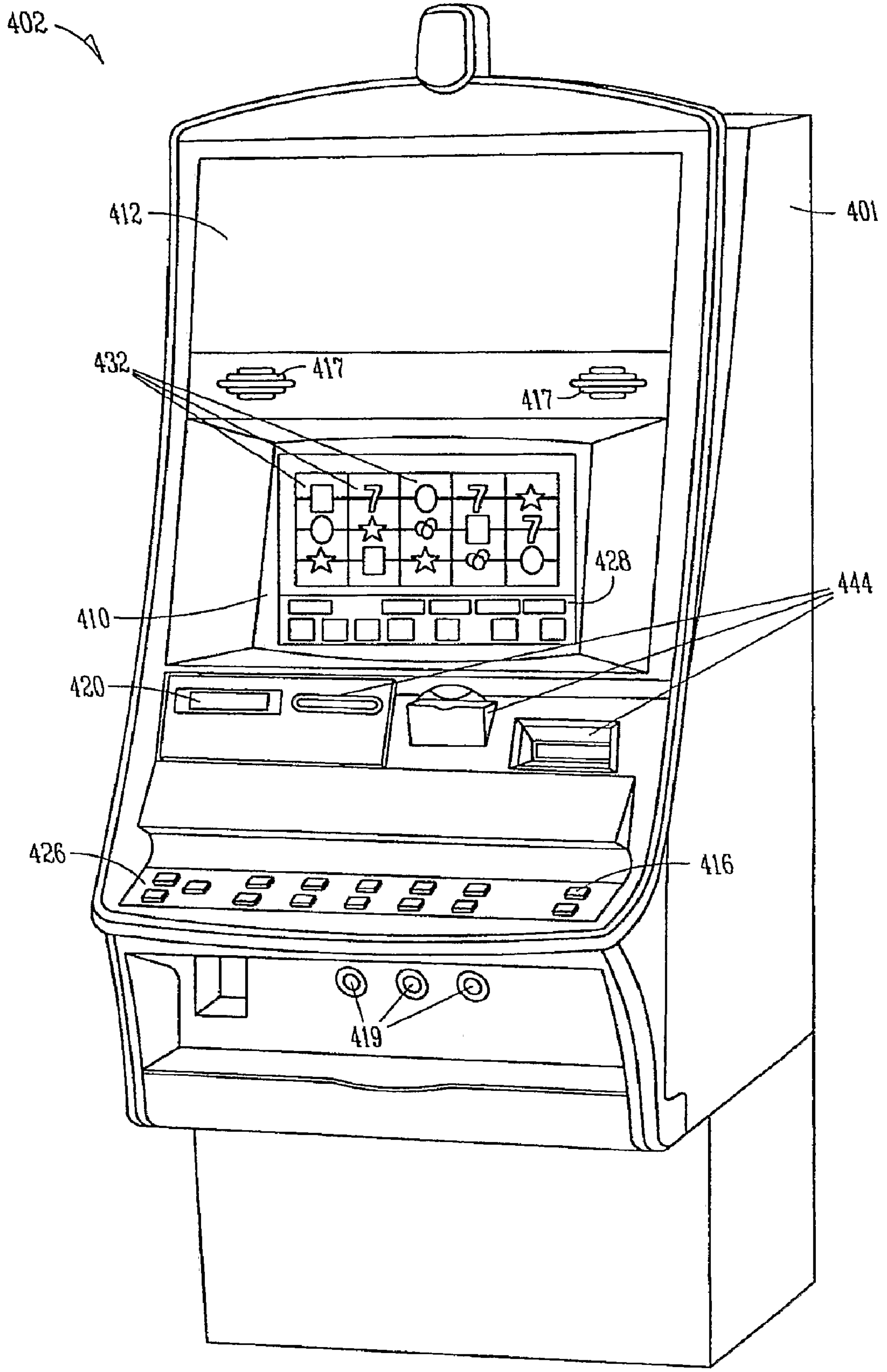
FIG. 4 is a perspective view of a wagering game machine, according to example embodiments of the invention.

FIG. 4 is a perspective view of a wagering game machine, according to example embodiments of the invention. Referring to FIG. 4, a wagering game machine 402 (which may be similar to or identical to the machines 106, 202 described above) may be used in gaming establishments, such as casinos. According to some embodiments, the wagering game machine 402 can be any type of wagering game machine and can have varying structures and methods of operation. For example, the wagering game machine 402 can be an electromechanical wagering game machine configured to play mechanical slots, or it can be an electronic wagering game machine configured to play video casino games, such as blackjack, slots, keno, poker, blackjack, roulette, etc.

The wagering game machine 402 may comprise a housing 401 and includes input devices, such as value input devices 444 and player input devices 416. For output, the wagering game machine 402 may include a primary display 410 for displaying information about a basic wagering game. The primary display 410 can also display information about a bonus wagering game and a progressive wagering game. The wagering game machine 402 may also include a secondary display 412 for displaying wagering game events, wagering game outcomes, and/or signage information, as well as serving as one of several resources that may be shared with other wagering game machines.

Either the primary display 410 and/or secondary display 412 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status, including diagnostic information. While some components of the wagering game machine 402 are described herein, numerous other elements can exist and can be used in any number or combination to create varying forms of the wagering game machine 402.

For example, the player input device 416 may comprise, in some embodiments, a plurality of push buttons on a button panel 426 for operating the wagering game machine 402. In addition, or alternatively, the player input device 416 can comprise a touch screen 428. In one aspect, the touch screen 428 may be matched to a display screen having one or more selectable touch keys selectable by a user's touching of the associated area of the screen using a finger or a tool, such as a stylus pointer, as is well known to those of skill in the art. A player may enable a desired function either by touching the touch screen at an appropriate touch key or by pressing an appropriate push button on the button panel 426. The touch keys can be used to implement the same functions as push buttons. Alternatively, the push buttons on the button panel 426 can provide inputs for one aspect of the operating the game, while the touch keys can allow for input needed for another aspect of the game.

The wagering game machine 402 may further include one or more speakers 417, one or more player-accessible ports 419 (e.g., an audio output jack for headphones, a video headset jack, etc.), and other conventional I/O devices and ports, which may or may not be player-accessible. In some embodiments, the player-accessible ports 419 may be coupled to a USB hub (e.g., a multi-host USB hub) to be used as described above with respect to the wagering game machine 106 shown in FIG. 1. In this case the USB hub might be used to interface or couple multiple wagering game machines, similar to or identical to the wagering game machine 402, to a shared USB peripheral or resource so that the any one or more of the wagering game machines so coupled may be used to control and share the peripheral/resource.

The value input devices 444 can take any suitable form and can be located on the front of the housing 401. The value input devices 444 can receive currency and/or credits inserted by a player. The value input devices 444 can include coin acceptors for receiving coin currency and bill acceptors for receiving paper currency. Furthermore, the value input devices 444 can include ticket readers or barcode scanners for reading information stored on vouchers, cards, and other tangible portable storage devices. The vouchers or cards can authorize access to central accounts, which can transfer money to the wagering game machine 402. Some wagering game machines 402 may utilize RFID technology to passively identify players and accept payment using an RFID tag or similar device carried by a player without the player having to affirmatively act, or enter anything physical into the game.

Player-accessible value input devices 444 can comprise, for example, a slot located on the front, side, or top of the housing 401 configured to receive credit from a stored-value card (e.g., casino card, smart card, debit card, credit card, etc.) inserted by a player. Player-accessible value input devices 444 can also comprise a sensor (e.g., an RF sensor) configured to sense a signal (e.g., an RF signal) output by a transmitter (e.g., an RF transmitter) carried by a player. The player-accessible value input devices 444 can, in addition or alternatively, include a ticket reader, or barcode scanner, for reading information stored on a credit ticket, a card, or other tangible portable credit or funds storage device. The credit ticket or card can also authorize access to a central account, which can transfer money to the wagering game machine 402.

Still other player-accessible value input devices 444 can require the use of touch keys on the touch-screen display 428 or player input devices 416. Upon entry of player identification information and, preferably, secondary authorization information (e.g., a password, PIN number, stored value card number, predefined key sequences, etc.), the player can be permitted to access a player's account. As one potential optional security feature, the wagering game machine 402 can be configured to permit a player to only access an account the player has specifically set up for the wagering game machine 402. Other conventional security features can also be utilized to, for example, prevent unauthorized access to a player's account, to minimize an impact of any unauthorized access to a player's account, or to prevent unauthorized access to any personal information or funds temporarily stored on the wagering game machine 402.

The player-accessible value input devices 444 may include a biometric information reader (e.g., perhaps coupled to an identification unit 150 as shown in FIG. 1) which permits the player to access available funds on a player's account, either alone or in combination with another of the aforementioned player-accessible value input devices 444. In an embodiment wherein the player-accessible value input device 444 comprises a biometric information reader, transactions such as an input of value to the wagering game machine 402, a transfer of value from one player account or source to an account associated with the wagering game machine 402, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 444 comprising a biometric player information reader can require a confirmatory entry from another biometric player information reader, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 444 can be provided remotely from the wagering game machine 402, perhaps shared by another wagering game machine.

The various components of the wagering game machine 402 can be connected directly to, or contained within, the housing 401, as seen in FIG. 4, or can be located outside the housing 401 and connected to the housing 401 via a variety of wired (tethered) or wireless connection methods. Thus, the wagering game machine 402 can comprise a single unit or a plurality of interconnected (e.g., wireless connections) parts which can be arranged to suit a player's preferences.

Similarly, the various components of the wagering game machine 402 can be connected directly to, or contained within, the housing 401. Alternatively, some of the wagering game machine's components can be located outside of the housing 401, while being communicatively coupled with the wagering game machine 402 using any suitable wired or wireless communication technology.

The operation of the basic wagering game can be displayed to the player on the primary display 410. The primary display 410 can also display a bonus game associated with the basic wagering game. The primary display 410 can include a cathode ray tube (CRT), a high resolution liquid crystal display (LCD), a plasma display, light emitting diodes (LEDs), or any other type of display suitable for use in the wagering game machine 402. Alternatively, the primary display 410 can include a number of mechanical reels to display the outcome. In FIG. 4, the wagering game machine 402 is an "upright" version in which the primary display 410 is oriented vertically relative to the player. Alternatively, the wagering game machine can be a "slant-top" version in which the primary display 410 is slanted at about a thirty-degree angle toward the player of the wagering game machine 402. In yet another embodiment, the wagering game machine 402 can exhibit any suitable form factor, such as a free standing model, bartop model, mobile handheld model, or workstation console model.

A player may begin playing a basic wagering game by making a wager via the value input device 444. The player can initiate play by using the player input device's buttons or touch screen 428. The basic game can include arranging a plurality of symbols along a payline 432, which indicates one or more outcomes of the basic game. Such outcomes can be randomly selected in response to player input. At least one of the outcomes, which can include any variation or combination of symbols, can trigger a bonus game.

In some embodiments, the wagering game machine 402 can also include an information reader 420, which can include a card reader, ticket reader, bar code scanner, RFID transceiver, or computer-readable storage medium interface (e.g., a universal serial bus jump drive port). In some embodiments, the information reader 420 can be used to award complimentary services, restore game assets, track player habits, etc.

Implementing the apparatus, systems, and methods disclosed herein may operate to provide wagering game machines that are more easily maintained and updated. In addition, player interest and loyalty may be enhanced since the absence of a resource on a particular wagering game machine need not serve as an impediment to further game play in many embodiments.

General

In this description, reference is made to specific examples by way of drawings and illustrations. These examples are described in sufficient detail to enable those skilled in the art to practice the inventive subject matter, and serve to illustrate how the inventive subject matter may be applied to various purposes or embodiments. Other embodiments are included within the inventive subject matter, as logical, mechanical, electrical, and other changes may be made to the example embodiments described herein. Features or limitations of various embodiments described herein, even if potentially essential to the example embodiments in which they are incorporated, do not limit the inventive subject matter as a whole, and any reference to the invention, its elements, operation, and application are not limiting as a whole, but serve only to define these example embodiments.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the description, with each claim standing on its own as a separate embodiment.

What is claimed is:

1. A gaming system configured to share resources between a plurality of gaming machines that are connected for communication, the gaming system comprising:

one or more input devices for receiving player inputs;

one or more display devices;

one or more processors;

a resource locator including resource information on available hardware resources; and one or more memory devices storing instructions that, when executed by at least one of the one or more processors, cause the one or more processors to operate with the resource locator, the one or more input devices, and the one or more display devices to:

receive an indication of a wager from a player initiating a wagering game on a first gaming machine of the plurality;

display the wagering game on at least one of the one or more display devices; and prior to the player cashing out of the first gaming machine, (i) detect a request from the first gaming machine for a hardware resource residing in the first gaming machine to perform a function, (ii) determine that the requested resource is unavailable on the first gaming machine, (iii)search, via the resource locator, for the requested resource on at least one of the gaming system and the plurality of gaming machines, and (iv)in response to locating the requested resource on the gaming system or on a second gaming machine of the plurality, access the requested resource and perform the function via the resource on the gaming system or on the second gaming machine.

2. The gaming system of claim 1, wherein the resource locator resides in the second gaming machine.

3. The gaming system of claim 2, wherein the resource locator includes a multi-host universal serial bus (USB) hub connected to the first gaming machine and to the requested resource, and wherein searching for the requested resource includes searching the multi-host USB hub interface ports.

4. The gaming system of claim 3, wherein accessing the requested resource includes the first gaming machine controlling the requested resource via the multi-host USB hub.

5. The gaming system of claim 1, wherein gaming system further comprises a wagering game server connected to the plurality of gaming machines via a communications network, and wherein the resource locator resides in the wagering game server.

6. The gaming system of claim 1, wherein the instructions further cause the at least one processor, in response to failing to locate the requested resource on either the gaming system or on the plurality of gaming machines, to notify the player of the failure via at least one of the one or more display devices.

7. The gaming system of claim 1, wherein accessing the requested resource includes the second gaming machine controlling the resource according to instructions received from the first gaming machine.

8. The gaming system of claim 1, wherein at least one of the plurality of gaming machines includes resource information concerning hardware resources available at other gaming machines of the plurality, and wherein searching for the requested resource includes searching the resource information.

9. The gaming system of claim 8, wherein the resource information includes asset numbers input by an operator, wherein the asset numbers correspond to the available hardware resources.

10. A gaming system configured to share hardware resources between a plurality of gaming machines that are connected for communication via a communications network, the gaming system comprising:

a wagering game server on the communications network, the wagering game server comprising a resource locator that includes resource information on available hardware resources;

one or more input devices for receiving player inputs;

one or more display devices;

one or more processors; and one or more memory devices storing instructions that, when executed by at least one of the one or more processors, cause the one or more processors to operate with resource locator, the one or more input devices, and the one or more display devices to:

receive an indication of a wager from a player initiating a wagering game on a first gaming machine of the plurality;

display the wagering game on at least one of the one or more display devices; and prior to the player cashing out of the first gaming machine, (i) detect a request from the first gaming machine for a hardware resource residing in the first gaming machine to perform a function, (ii) determine that the requested resource is unavailable on the first gaming machine, (iii)search the resource information for the requested resource, (iv)in response to the required resource being located on a second gaming machine of the plurality, access the requested resource via the resource locator and perform the function via the resource on the second gaming machine.

11. The gaming system of claim 10, wherein accessing the requested resource includes the second gaming machine controlling the requested resource in response to instructions received from the first gaming machine.

12. The gaming system of claim 11, wherein the instructions from the first gaming machine are received by the resource locator and transmitted to the second gaming machine by the resource locator.

13. The gaming system of claim 10, wherein the resource locator further includes mapping information corresponding to the locations of the available hardware resources, and wherein the instructions further cause at least one of the one or more processors to operate with the resource locator and at least one of the one or more display devices to notify the player of the location of the second gaming machine.

14. A computer-implemented method of sharing hardware resources between a plurality of gaming machines that are connected for communication, the plurality of gaming machines including one or more input devices, one or more display devices, one or more processors, and one or more memory devices, the method comprising:

receiving, via at least one of the one or more input devices, an indication of a wager from a player to initiate a wagering game on a first gaming machine of the plurality;

displaying, via at least one of the one or more display devices, the wagering game; and prior to the player cashing out of the first gaming machine, (i) detecting a request from the first gaming machine for a hardware resource residing in the first gaming machine to perform a function;

(ii) determining that the requested resource is unavailable on the first gaming machine, (iii)searching, via a resource locator including resource information on available hardware resources, for the requested resource on the plurality of gaming machines, and (iv)in response to locating the requested resource on a second gaming machine of the plurality, accessing, via the resource locator, the requested resource and performing the function via the resource on the second gaming machine.

15. The method of claim 14, wherein the resource locator resides in the second gaming machine.

16. The method of claim 14, wherein the resource locator includes a multi- host universal serial bus (USB) hub connected to the first gaming machine and to the requested resource, and wherein searching for the requested resource includes searching the multi-host USB hub interface ports.

17. The method of claim 16, wherein accessing the requested resource includes the first gaming machine controlling the requested resource via the multi-host USB hub.

18. The method of claim 14, further comprising, in response to failing to locate the requested resource on the plurality of gaming machines, notifying the player of the failure via at least one of the one or more display devices.

19. The method of claim 14, wherein accessing the requested resource includes the second gaming machine controlling the resource according to instructions received from the first gaming machine.

20. The method of claim 14, wherein at least one of the plurality of gaming machines includes resource information concerning hardware resources available at other gaming machines of the plurality, and wherein searching for the requested resource includes searching the resource information.

21. A machine-readable, non-transitory medium including executable instructions that, when executed by at least one of one or more processors, cause the one or more processors to operate with one or more input devices and one or more display devices to perform a method comprising:

receiving, via at least one of the one or more input devices, an indication of a wager from a player to initiate a wagering game on a first gaming machine of a plurality of gaming machines, wherein the plurality of gaming machines are connected for communication;

displaying, via at least one of the one or more display devices, the wagering game; and prior to the player cashing out of the first gaming machine, (i) detecting a request from the first gaming machine for a hardware resource residing in the first gaming machine to perform a function;

(ii) determining that the requested resource is unavailable on the first gaming machine, (iii)searching, via a resource locator including resource information on available hardware resources, for the requested resource on the plurality of gaming machines, and (iv)in response to locating the requested resource on a second gaming machine of the plurality, accessing, via the resource locator, the requested resource and performing the function via the resource on the second gaming machine.

* * * * *

UNITED STATES PATENT AND TRADEMARK OFFICE

CERTIFICATE OF CORRECTION

PATENT NO. : 8,376,835 B2
APPLICATION NO. : 12/375883
DATED : February 19, 2013
INVENTOR(S) : Ryan et al.

It is certified that error appears in the above-identified patent and that said Letters Patent is hereby corrected as shown below:

On the title page, Item -56- in column 2, under “Other Publications”, line 2, delete “2008.”8 pgs.” and insert --2008”, 8 pgs.--, therefor On title page 2, Item -56- in column 2, under “Other Publications”, line 2, delete “Mailed” and insert --mailed--, therefor On title page 2, Item -56- in column 2, under “Other Publications”, line 2, delete “2009”.” and insert --2009”, 4 pgs.--, therefor In the Specification In column 6, line 60, after “embodiments,”, delete “the”, therefor In column 10, line 41, delete “2.5 G” and insert --2.5G--, therefor In column 10, line 41, delete “3 G” and insert --3G--, therefor In column 10, line 54-55, delete “Bluetooth®” and insert --Bluetooth™--, therefor In column 11, line 11, delete “maybe” and insert --may be--, therefor In column 12, line 12, after “searching”, delete “.”, therefor In column 14, line 11, after “poker,”, delete “blackjack”, therefor In the Claims In column 19, line 51, in Claim 14, delete “function;” and insert --function,--, therefor In column 20, line 9, in Claim 16, delete “multi- host” and insert --multi-host--, therefor In column 20, line 44 (Approx.), in Claim 21, delete “function;” and insert --function,--, therefor Signed and Sealed this
Twenty-second Day of April, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,376,835 B2
APPLICATION NO. : 12/375883
DATED : February 19, 2013
INVENTOR(S) : Ryan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this
First Day of September, 2015

Michelle K. Lee
*Director of the United States Patent and Trademark Office*